Nov. 7, 1967 W. A. RUDERFER 3,351,219
WAREHOUSING ORDER SELECTION SYSTEM
Filed April 9, 1965 6 Sheets-Sheet 2

INVENTOR.
WALTER A. RUDERFER

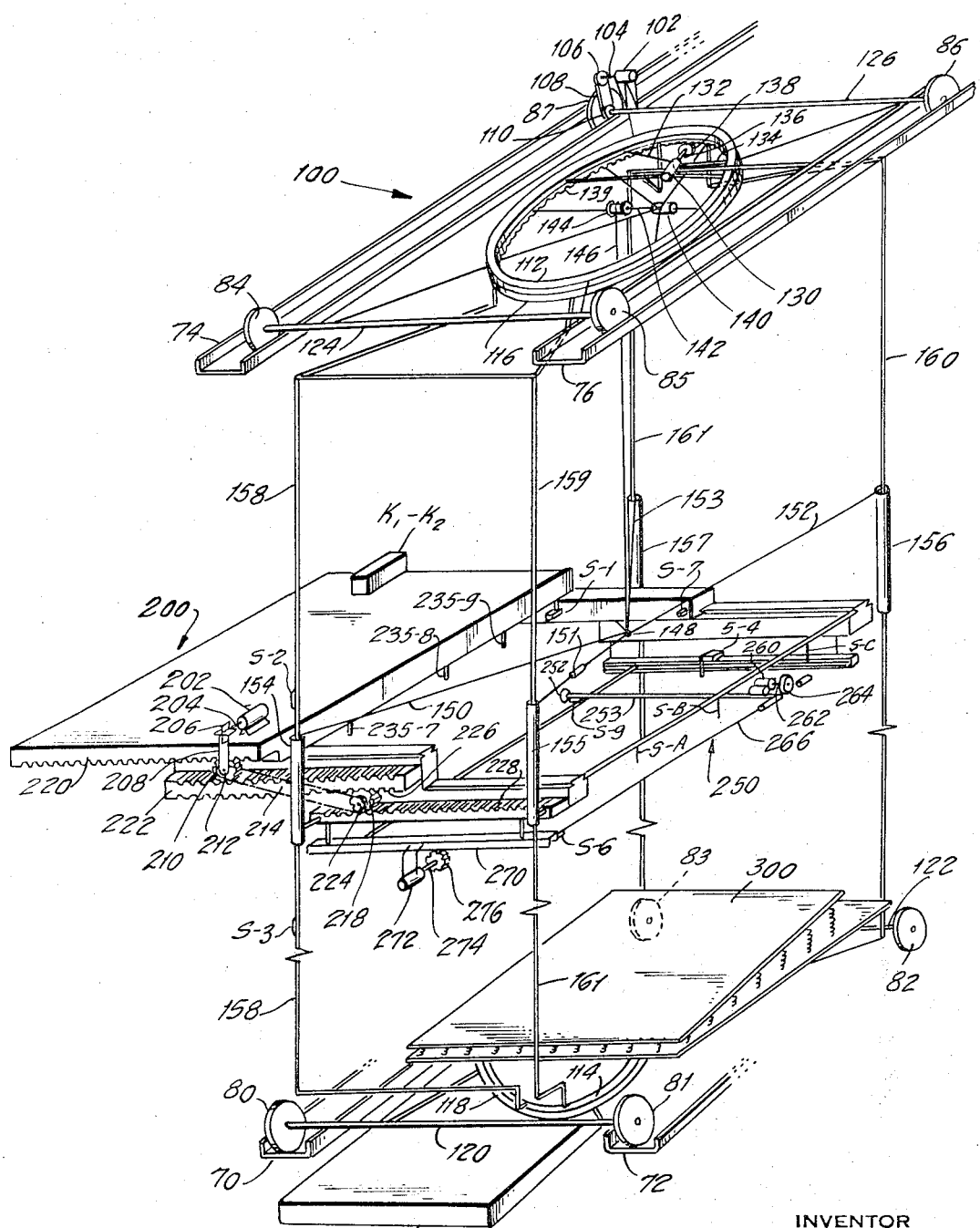

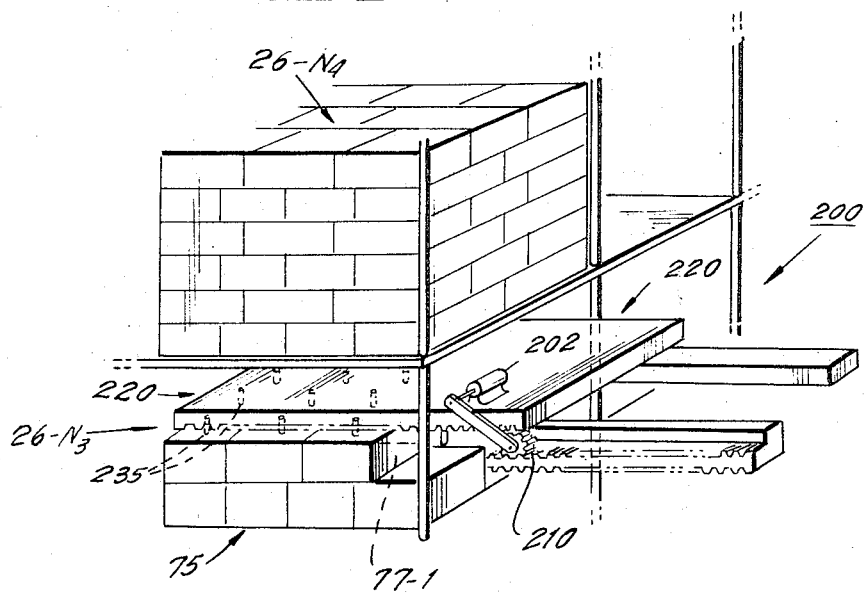
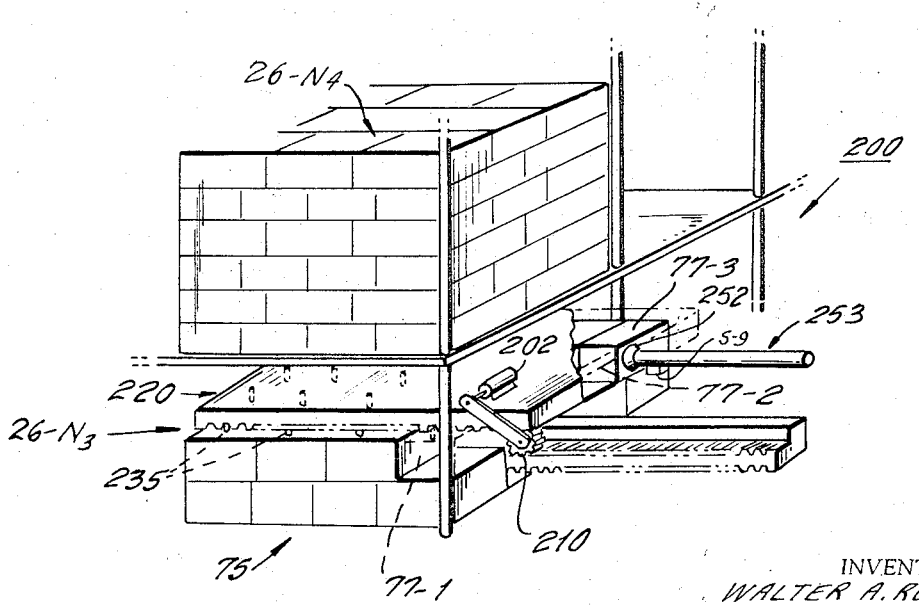

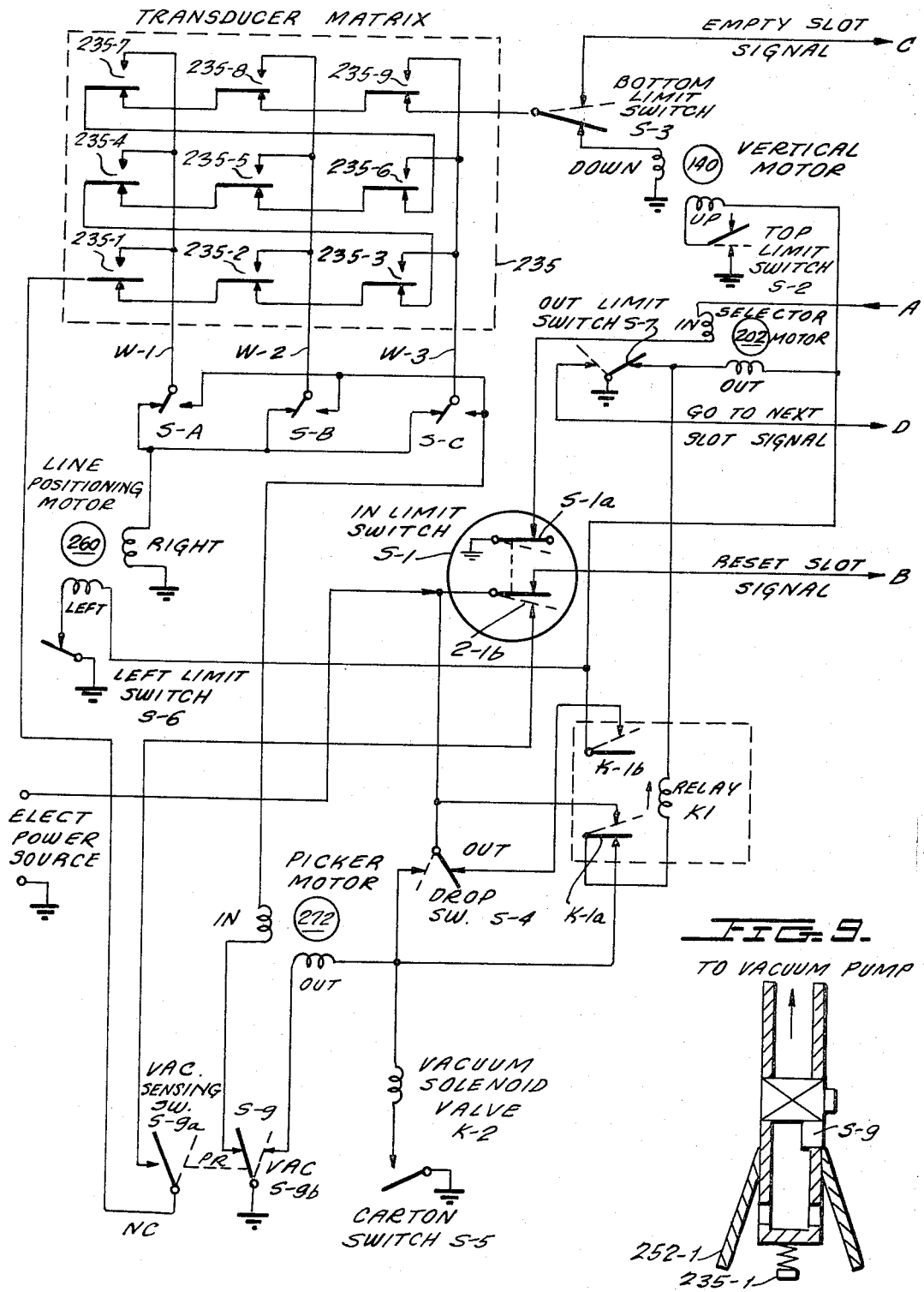
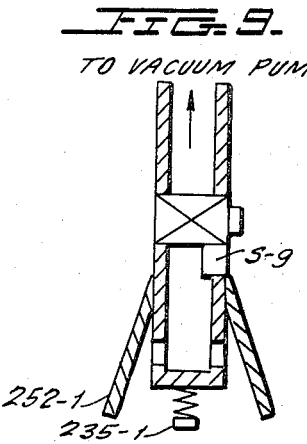

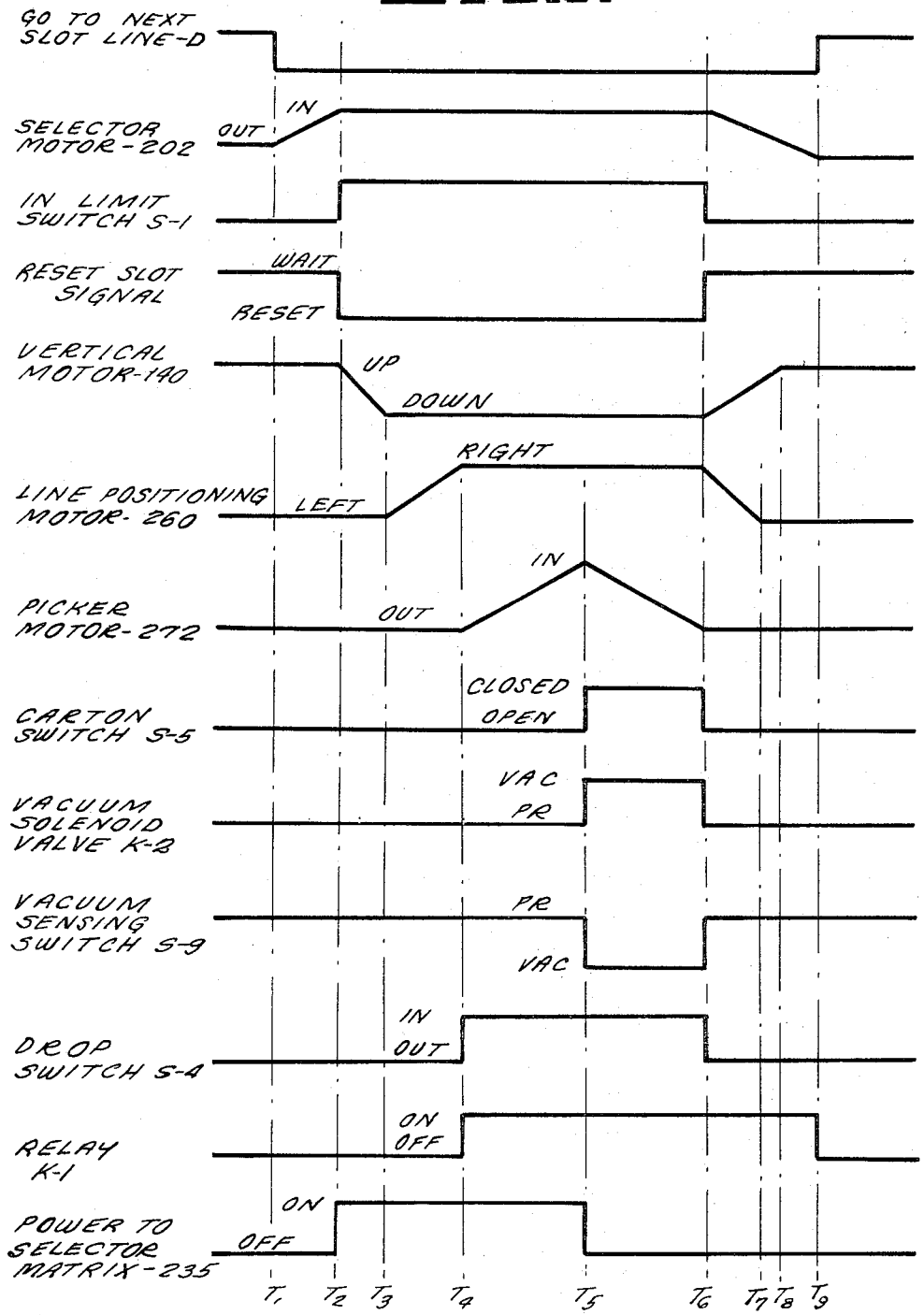

United States Patent Office 3,351,219
Patented Nov. 7, 1967

3,351,219
WAREHOUSING ORDER SELECTION SYSTEM
Walter A. Ruderfer, Mattapan, Mass.
(8748 Metcalf, Overland Park, Kans. 66212)
Filed Apr. 9, 1965, Ser. No. 446,926
24 Claims. (Cl. 214—16.4)

ABSTRACT OF THE DISCLOSURE

A selective order selection system for removing individual articles from a pallet-type unit load, in which the actual condition of articles remaining at the desired unit load is sensed and a picker means is actuated to individually remove the next article, and including a warehousing system employing same.

---

The present invention relates to an automatic article handling system, and more particularly to warehousing distribution systems wherein articles of various character are stored as unit loads within a racked array of stalls, and in the course of order picking therefrom, it is desired to selectively remove individual articles from such unit loads.

In warehouses operated by distribution organizations, a variety of article types are received in large unit quantities. Such merchandise is then classified, grouped and stored in such large quantities for ultimate distribution in lesser quantities to the various outlets. The distribution warehouse usually includes a receiving area where trucks, freight cars or similar bulk transporters can discharge their merchandise; a storage area where the merchandise is classified and stored within a plurality of individual stalls for order selection; and a shipment area where the selected merchandise is accumulated and assembled into orders for dispatching to the various outlets. The storage area typically includes a racked array of individual storage stalls, in adjacent vertical and horizontal rows. Access to the stall array is provided along a common aisle, such that an order picker moving along the aisle may select various ones of the merchandise types located within the adjacent individual stalls.

The instant invention is concerned with the automatic picking of orders within the storage area, and specifically to a novel system which permits individual cartons or similar articles to be selectively removed from a stall location containing a substantial number of similar articles.

For convenience of handling merchandise within the warehouse, it is the general practice to group similar types of articles into tiered layers having dimensions suitable for movement by a fork-lift truck, a multiple carton handling apparatus. Since the overall dimensions of such groupings, termed unit loads, will be kept generally similar, but their individual carton dimensions vary considerably, it should naturally be understood that the number and arrangement of individual articles within the unit loads will differ for the different merchandise types. The storage stalls are of a dimension adapted to conveniently receive such unit loads, with one or more unit loads of the same merchandise type being receivable in an individual stall location. Where a number of unit loads are placed within an individual stall, they are placed one behind the other and successively moved towards the article selection aisle, as the preceding unit load is depleted. Although the merchandise is stored within the stalls in such groupings of unit loads, it is quite often desired to select only a portion of such a unit load in the filling of an individual order destined for a particular outlet. For example, considering a typical grocery distribution warehouse, an order for a retail outlet might require five cartons of a particular detergent, three cartons of a cereal and one carton of a particular type of canned goods.

The diverse nature of goods encountered and the considerable disparity in individual order requirements have heretofore presented considerable problems to the design of an efficient system capable of such order selection. Although there has long been a need for an automated system capable of such order filling, the presently practiced systems still rely essentially on manual picking of the articles. The need for an automated distribution warehousing system has become particularly acute in recent times because of rising labor costs and the increasing advent of frozen foods. As to the latter, considerable warehousing areas must now be maintained at freezing temperatures. Such areas are, naturally, quite uncomfortable to work in for extended time periods and have resulted in making manual order selection even less efficient. Also such frozen food warehouses are quite costly to maintain and it is desirable to make maximum use of the available volume, while minimizing those portions devoted to other than storage of merchandise.

There have been systems presently proposed where the articles are individually stored, one behind the other, on conveyor belts or gravity fed chutes. As the order is picked, the belts or chutes containing the articles are individually activated to release the desired number of articles, which articles are then transported to an accumulation area. Such systems do not permit the articles to be stored in unit loads, therefore requiring excessive lengths and extremely costly arrangements of storage belts or chutes. While applicable for picking orders of relatively small articles as, for example, within the retail outlet itself, such systems do not lend themselves to the efficient selection of bulk carton orders as is required within a distribution warehouse.

It is also known to automatically program a picking unit to a desired stall location and remove the entire unit load from such location. Such systems would be suitable for manufacturer's warehouses or conveying work-in-process wherein the movement of goods is required in multiples of unit loads. However, the inability of such systems to selectively remove individual articles from the unit load location would limit the practicality of their use in distribution warehouses wherein the customer demand requires provision for individual article order picking.

It is a primary object of the instant invention to solve these problems of automated distribution warehousing in an efficient manner. The invention provides an article handling apparatus which, when directed to the desired stall location, will remove individual articles therefrom. To accomplish this, a system coordinated searching means and picking means is employed. The searching means determines the orientation of articles remaining within the particular unit load and establishes the position within the unit load of the next article to be selectively removed therefrom. This information is then directed to the picking means for positioning an article engaging means at the determined position of the next article to be removed. The article engaging means is constructed to engage the desired article, and remove such article from the unit load while the other articles of the unit load remain substantially intact.

It is accordingly a further object of the instant invention to provide the combination of a searching means for determining the orientation of articles stored within a unit load location, and a picking means responsive thereto for removing an individual article of the unit load, while the remaining articles of the unit load remain substantially intact.

Another object is to provide within an automatic warehousing system having a storage volume including a plurality of individual storage stalls for receiving unit loads of different article character, an order selection means movable along the aisle for sequential positioning at desired stall locations, and including such a combined searching means and picking means for removing individual articles from the unit loads stored within such stall locations.

In the illustrative embodiment of the present invention, the searching means comprises a support member containing a transducer means. The support member is positionable into the stall location, above the unit load. The transducer means are distributed about the surface of the support member to sense the presence of an article at predetermined positions within the boundaries of the unit load. The transducer means may typically be depending limit switch members, space separated about the surface of the support member. After the searching means is positionable above the desired unit load location, it is moved downward until one or more of the individual transducer members contact the remaining articles within the unit load. This indicates both the uppermost layer of the unit load still containing articles, and the next article to be removed in accordance with a predetermined picking sequence. This information is then used to position the picking means, which is shown as a reciprocable arm having an article engaging means in the form of a suction pad at its terminus. The picking means engages such an individual article and removes same, with the searching means and picking means then returning to their initial positions for subsequent article removal from the same or another storage stall.

It is thus an additional object of the present invention to provide a searching means including a transducer means for determining the orientation of articles within a unit load, and establishing a unit load condition signal operatively related to the position within the unit load of the next articles to be removed therefrom.

Still a further object is to provide such a searching means including a matrix of individual transducer members positionable to determine the presence of an article at predetermined positions within the unit load.

Still another object is to provide in combination with such a searching means, a reciprocable picking arm positionable responsive to the unit load condition signal for engagement with the next article to be removed.

As another advantageous aspect of the particular embodiment selected to illustrate the present invention, storage racking areas are located at either side of the article selection aisle. The order selection means comprising the coordinated searching means and picking means travels: horizontally along the article selection aisle to the desired row; vertically to the desired slot height; as well as turning 180° to the desired aisle side. The racking areas are loaded from the rear via alternating loading aisles, with such loading capable of being performed simultaneously with the selection of orders. The selection and loading aisles may be of minimum width, and do not require the installation of periodic cross aisles, as commonly employed in warehouses designed for manual order selection. Further, the racking areas may be provided up to the maximum practical ceiling height, thereby maximizing the utilization of available space, and effecting considerable economies of operation.

These as well as other objects and advantages of the instant invention will become apparent upon a consideration of the accompanying drawings in which:

FIGURE 3 is a perspective view of a form of the order selection means of the instant invention.

FIGURE 5 shows the searching means lowered into engagement with the uppermost layer of the unit load.

FIGURE 6 shows the picker arm in engagement with the next article of the unit load to be sequentially removed.

FIGURE 7 is an electrical schematic of the control circuit for the article handling system of the present invention.

FIGURE 8 is a timing diagram, illustrating the sequential operation of the system components.

FIGURE 9 is a cross-section view of a modified embodiment, showing the incorporation of the picking means into the searching support member.

Figure 1:
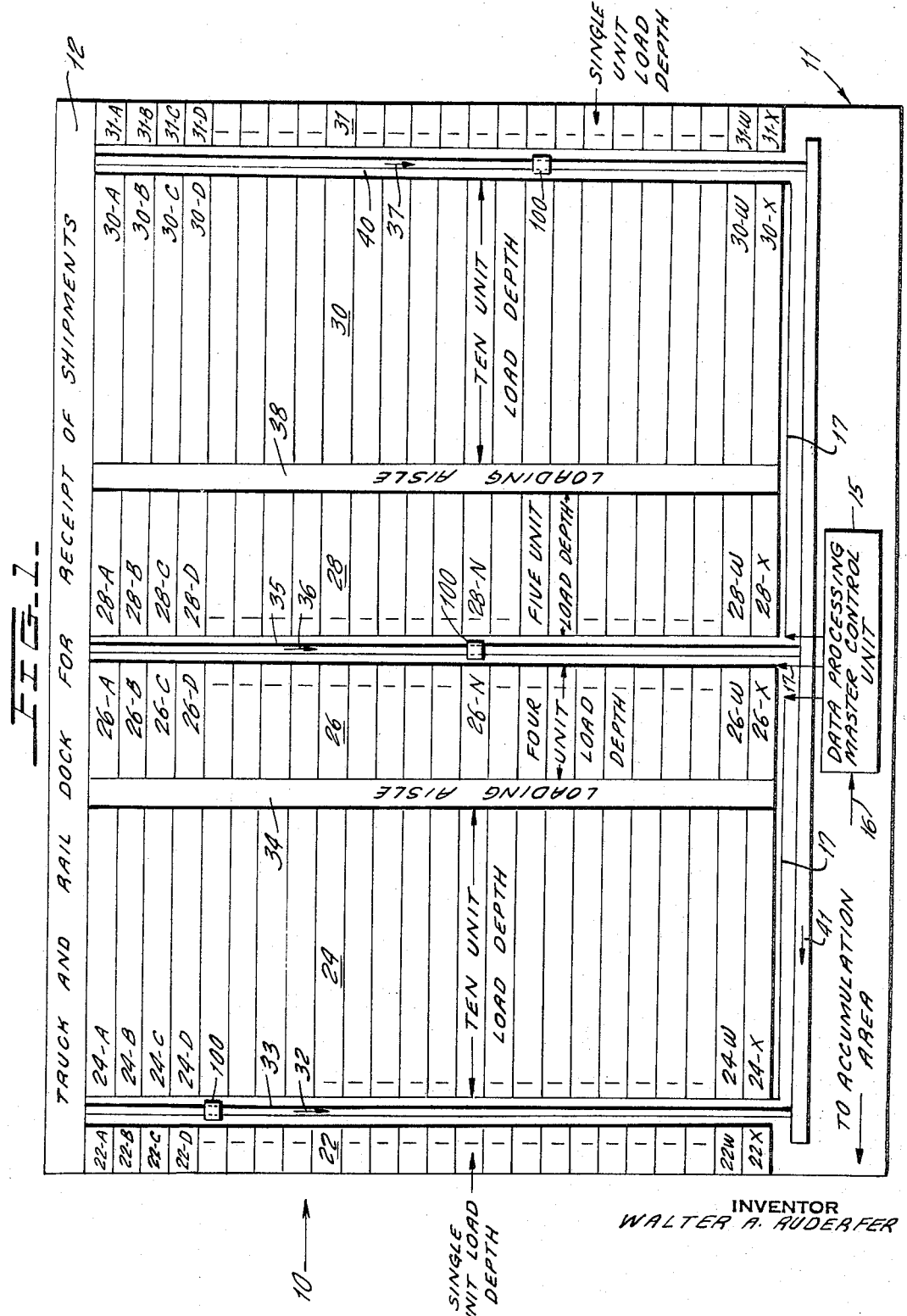
FIGURE 1 is a simplified diagrammatic plan view of a typical warehouse layout incorporating the novel features of the instant invention.

Referring to the drawings in detail and initially to FIG. 1 thereof, a warehousing system 10 is illustratively shown contained within building 11. The particular layout of the warehouse 10 is only one of numerous such warehouse systems which may be constructed to include the novel article handling system embodied within the general concept of the instant invention, and accordingly is not intended as a limitation of its application.

Figure 2:
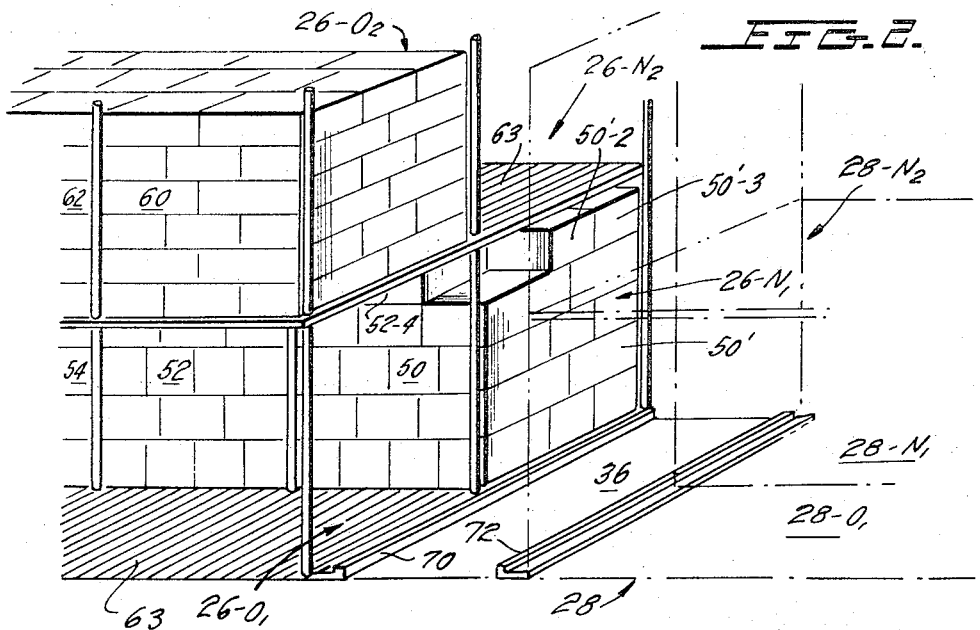
FIGURE 2 is a perspective view of a portion of the warehouse, showing the manner in which individual unit loads are stored within the stall locations.

Warehouse system 10 is shown including a receiving area 12 wherein trucks, freight cars or similar transporters of bulk shipments can discharge their merchandise. The warehouse storage volume is shown divided into individual storage sections, or racking areas, 22, 24, 26, 28, 30 and 31, respectively. Each of these racking areas comprises a stacked array of individual storage slots or stalls, adjacently aligned along longitudinal aisles indicated as 32, 34, 36, 38 and 40, respectively. In the illustrative embodiment, twenty-four individual stall locations are included along the aisle and are indicated by the subscripts A, B, C, . . . X of their respective racking areas. The stalls are also in vertically upwardly extending tiers to form the well-known type of racking array, as shown in FIGURE 2. Within each of the racking areas, the stalls are of a predetermined depth to accommodate a desired number of unit loads of the articles to be stored therein. That is, for convenience of handling merchandise within a warehouse, it is the general practice to group similar articles received at the receiving area 12 into stacked arrays (such as unit loads 50, 52, 54 of FIG. 2) having dimensions suitable for movement as a group by conventional fork-lift devices or multiple carton handling apparatus. The unit loads are then moved from the receiving area 12 into the desired slot designated for its particular commodity. The correlation of such movement may be governed by an appropriate data processing system, generally shown as 15, to automatically direct the received merchandise to a partially filled stall location for that commodity, or to the next available stall location should the previous stall containing that commodity have its full capacity of unit loads or the warehouse is depleted of that commodity. The stall locations of the various types of merchandise is stored within the memory portion of the data processing system to program the order selection means of the instant invention on a first in-first out basis.

It has been found through practice that certain items require more storage space than others, with such requirements resulting from increased customer demand or greater carton size. To most efficiently account for this requirement, the various racking areas in the warehouse are of a different depth. The greater stall depths are naturally intended for those commodities requiring more storage area. Typically, storage areas 22 and 31 may be only of a single-unit-load, and will, therefore, most advantageously be used in conjunction with goods of minimum demand. Racking areas 24 and 30 are shown as being a ten-unit-load depth, with racking area 26 being of a four-unit-load depth and racking area 28 of a five-unit-load depth. Racking areas 22, 24 face the opposite sides of aisle 32. Aisle 32 is used as the selection aisle for selecting from both of racking areas 22, 24. Similarly, aisle 36 is used as the common selection aisle for racking areas 26, 28 and aisle 40 is the common selection aisle for racking areas 30, 31. Aisle 34 located along the opposite ends of racking areas 24, 26 serves as the common loading aisle for these racking areas. Similarly, aisle 38 serves as the common loading aisle for racking areas 28, 30. With respect to the single-unit-load depth storage areas 22, 31, aisles 32 and 40, respectively, serve both as the selecting and loading aisles.

In operation as the merchandise is received at the receiving area 12, it is assembled into unit loads of generally uniform size and this information transmitted as an input 16 to the data processor control unit 15. The unit loads are then transported, as by conventional multiple carton handling apparatus (not shown) responsive to the command signals received along output lines 17 of the data processor control unit 15. The unit loads move along the loading aisles to their desired slot locations within the storage volume. Except for the case of the end racking areas 22, 31, such unit loads may be deposited in the rear end of their stall locations simultaneously with the selection of articles from the front end of the stalls by the novel order selection means 100 of the instant invention. Order selection means 100 is automatically dispatched, as by a command signal along line 17, to the slot location of the desired articles to be selected for fulfilling a particular customer order. Such positioning may likewise be obtained by various systems well-known in the art as, for example, that used in conjunction with automatic elevators, or those systems of the general type shown in U.S. Patent Nos. 3,119,501 and 3,139,994. When positioned at such desired stall location, the order selection means 100 removes the desired number of individual articles from the unit load, in a manner which will be subsequently discussed in greater detail. The selected articles are then transferred from the order selection means 100 to a conveyor 33, 35 or 37, running along the length of their respective selection aisles 32, 36 or 40, as indicated by the arrows. The articles are then transferred to transverse conveyor belt 41 which moves the goods to an accumulation area (not shown).

It is to be noted at this point that only a minimum area of the available storage volume is devoted to non-storage use. That is, the racking areas are located along the full warehouse length of the loading and selection aisles, with the automatic order selection means 100 of the instant invention preferably avoiding the need for periodic cross-aisles, as is conventionally necessary in those warehousing systems employing manual picking. Also, the vertical racking of stalls may extend substantially up to the ceiling limits of the warehouse. Typically, the unit load may be standardized at 48″ wide, 40″ deep and 6′ high. The width and height of the stalls are slightly in excess of the 48″ and 6′ dimensions to provide clearance. The height of the stall exceeds 6′, an amount necessary to accommodate the search means of the instant invention. Accounting for minimum clearances between the stalls, it is proposed to stack the stalls six high within an overall height of 40′. This height will preferably approximate the warehouse ceiling height.

Such maximum utilization of available storage volume is particularly advantageous with respect to frozen food warehousing. That is, should it be desirable to use the warehouse layout shown in FIG. 1 for the handling of frozen food exclusively, it is necessary to maintain the entire storage area at approximately −10° F. Because of the expense of constructing refrigerated warehouses, it is extremely desirable that the area of building be minimized and the use of space in the building be maximized.

Reference is now made to FIG. 2 which shows, in perspective, a portion of the storage volume as, for example, that portion wherein order selection means 100 of selection aisle 36 is shown located in FIG. 1. The order selection means 100 (which is shown in detailed FIG. 3) is, however, not shown in FIG. 2 for the purposes of simplicity. Aisle location 26–N includes a vertical array of stalls $26-N_1$, $26-N_2$, $26-N_3$, typically up to $26-N_6$. Adjacent stall location 26–O similarly includes vertically arrayed storage slot locations $26-O_1$, $26-O_2$, . . . $26-O_6$. On the opposite side of aisle 36, racking area 28 would similarly include stall locations $28-N_1$, $28-N_2$ directly opposite their corresponding slot locations of racking area 26. Storage slot location $26-N_1$ is typically shown including a successive array of unit loads 50, 52, 54 etc. Each of the units loads within a particular slot location such as $26-N_1$ contain identical products, and accordingly are essentially duplicates of one another. The unit loads contain individual articles, typically article cartons 50′. The articles are stacked in interlaced layers to maintain the unit load. For the particular article size shown in the unit loads 50, 52, 54 of storage slot $26-N_1$, a unit load of fifty articles is shown having five layers of ten articles each. The articles of unit loads 60, 62 shown stored in slot location $26-O_2$ are of a different size. The dimensions of individual articles 60′ are such that the stack includes six layers of six cartons each. The overall dimensions of unit loads 60, 62, however, correspond essentially to the overall dimensions of unit loads 50, 52, 54. The other stall locations of the racking array, shown empty principally for purposes of simplifying the drawings, similarly include the same or other articles, depending upon the particular storage requirements of each of the various types of goods maintained within the storage volume.

The bottom surfaces of the storage slots are typically shown as including slat conveyors 63, such that as each of the unit loads is depleted, the unit load immediately behind it will be moved forward towards selection aisle 36. The slat conveyor could be replaced with roller conveyor and flat unit load sized boards which support the load and which are automatically picked up by order selecting means 100 when empty and sent to the receiving area. The selection aisle 36 includes guide rails 70, 72, longitudinally extending along the bottom of the racking areas 26, 28, which guide rails cooperate with guide rails at the upper portion of the storage areas (shown in FIG. 3) for movement of the order selection means 100 to the appropriate aisle location.

Referring now to FIG. 3, the order selection means 100 may be any one of the similar such units movable along the respective order selection aisles 32, 36 or 40. Travel along the aisle is provided by lower wheels 80, 81, 82, 83 in engagement with guide rails 70, 72, and upper wheels 84, 85, 86, 87 in engagement with upper guide rails 74, 76, respectively. Such movement of the order selection assembly 100 responsive to an appropriate input direction signal is obtained by the actuation of drive motor 102. Drive motor 102 has an output shaft 104 having pinion 106 at the end thereof, for rotation of chain drive 108, which meshes with the geared hub of wheel 110.

Since the order selection assembly 100 moves along a selection aisle common to two racking areas, it may be necessary to then turn assembly 100 for operation in conjunction with the desired racking area. For example, should the assembly 100 be positioned at longitudinal aisle location N of aisle 36 as shown in FIG. 1, it is necessary to turn the unit 180° to operate in conjunction with either storage stall location 26–N or 28–N. This is accomplished by mounting the assembly on upper and lower rotating ring members 112–114, respectively. Cooperating stationary upper ring member 116 and outer ring member 118 are directly connected to the axles 120, 122, 124 and 126 of the aisle location drive. The desired 180° rotation is provided by drive motor 130 secured to upper stationary ring 116 via support rods 132, 134. Motor 130 has an output shaft 136 for rotating drive pinion 138 which engages cooperating peripherally located rack gear 139 along the bottom surface of upper rotating ring member 112.

To elevate the article removing portion of the order selection assembly 100 to the proper stall level, a motor 140 is provided. Motor 140 has an output shaft 142 keyed to pulley 144 which has cable 146 wrapped thereabout. Cable 146 extends downwardly to common point 148, wherein it meets support cables 150–153, connected to guide members 154–157, respectively. Guide members 154–157 vertically travel along support rods 158–161. The support rods are secured at their opposed ends to the upper and lower rotating ring members 112, 114, respectively.

When positioned adjacent the desired stall location, the instant invention is then operated in a novel manner permitting an individual article of the unit load located within such stall location to be selectively removed therefrom while the remaining articles of the unit load remain substantially intact. For example, referring back to FIG. 2, it is noted that the unit load 50 located within storage slot 26-$N_1$ has had one of the articles 50'-1 removed therefrom. Assuming a predetermined picking sequence from left to right, forward to back, it is desirable that the next article removed from unit load 50 be that indicated as 50'-2, with the succeeding article removed therefrom being that indicated as 50'-3, etc. To accomplish this, it is necessary that the order selection means 100 directed to slot location 26-$N_1$ have the ability to: (1) search the unit load 50 and determine the orientation of articles remaining within the unit load; (2) establish the position 50'-2 of the next article to be removed, and (3) direct a picking means to selectively remove article 50'-2 from the unit load 50, while the other articles remain in the stall location 26-$N_1$.

Referring back to FIG. 3, this is accomplished by the coordinated operation of a searching means generally shown as 200 and a picking means generally shown as 250. As will be subsequently discussed in greater detail, searching means 200 is moved into the desired slot location. When the searching means 200 is moved into the desired stall location, it then determines the orientation of the remaining articles of the unit load. The establishment of the orientation of the articles within the unit load may be obtained by appropriate transducer means operating in conjunction with the searching means 200. Such transducer means are typically shown as being depending limit switches, 235–1, 235–2, . . . 235–9 located about the surface of a support member 220. Alternatively, the transducer means employed may be of the non-contacting variety as, for example, ultra-sonic sensors, light sensors, electromagnetic energy responsive means or numerous other types of transducer constructions well-known in the art. Such transducer response information is then used to establish the position within the unit load of the next article to be removed in accordance with a predetermined picking sequence. The article engaging means 252 of picking means 250 is then directed to such position for removal of the article from the unit load.

Searching means 200 is moved into the desired slot location by the actuation of motor 202 having an output shaft 204, with drive pinion 206 keyed thereto. Drive pinion 206, in turn, engages chain drive 208 for rotation of gear member 210 via toothed hub section 212. The periphery of gear 210 engages rack gear sections 220, 222 of the searching means 200 for telescopic forward movement thereof. A further chain drive 214 is connected from gear 210 to the hub section 224 of additional gear member 218. Gear 218, in turn, engages rack gear sections 226, 228 to further provide the telescopic movement of the search means transducer support member 220 into the desired stall location. As an alternative to the rack and chain drive gear arrangement shown, the searching means 200 may be reciprocably moved into or out of the desired slot location by a conventional hydraulically actuated telescoping arm.

The picking means 250 includes a picker head 252, which may typically be a vacuum actuated suction pad of the type shown in U.S. Patent No. 3,027,023. The picker head 252 is moved laterally to the position of the desired article to be selected by means of drive motor 260 having an output shaft 262. This rotates position drive gear 264, which in turn engages geared rod 266. When located at the desired lateral position of the article to be removed, the picker head 252 is moved inwardly by an appropriate telescoping mechanism 270, reciprocably movable by drive motor 272, having output shaft 274 and drive gear 276 keyed thereto. Appropriate limit switches are also provided to govern the proper sequential operation of the searching means and picking means as will be subsequently discussed in conjunction with electrical schematic FIG. 7 and timing diagram 8.

Figure 4:
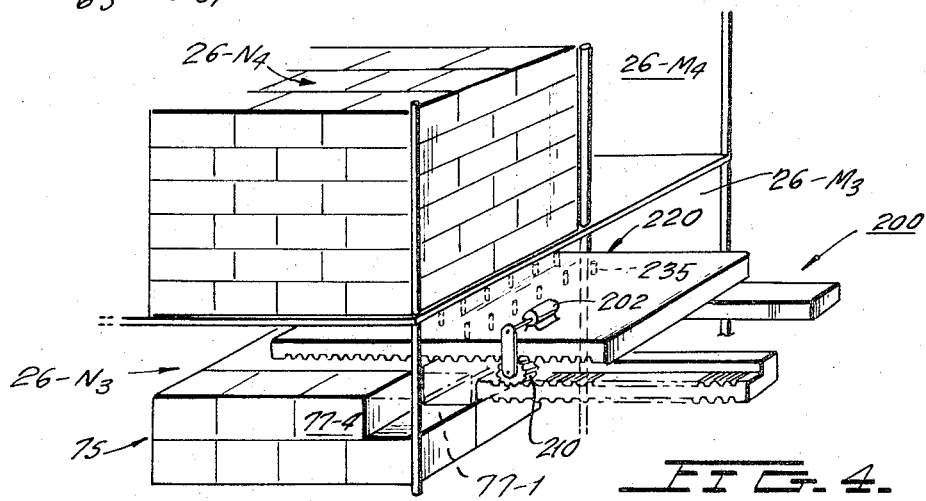
FIGURE 4 is a partial perspective view of the searching mechanism shown entering the desired storage slot location.
Figure 4A:
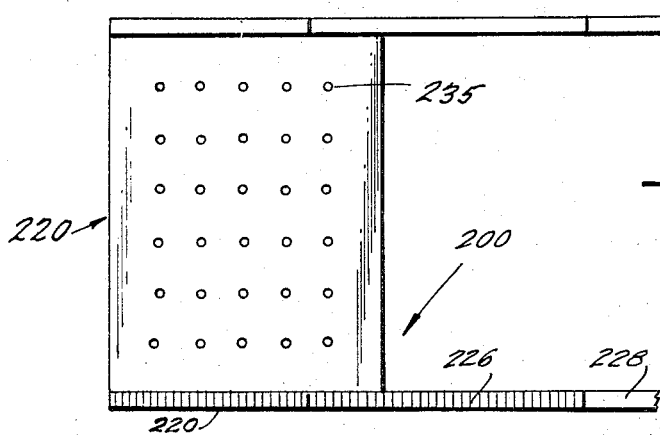
FIGURE 4A is a bottom view of the search support member, and showing a typical array of the transducer means matrix.

The basic operation of the order selection system of the instant invention is sequentially shown in simplified form in FIGS. 4–6. FIGURE 4 shows a condition wherein the support member 220 of searching means 200 is partially entered within the storage slot location as, for example, storage slot 26-$N_3$. Note that the searching means when initially entering the storage slot, enters it at the uppermost extreme of the storage slot and above the highest layer of the unit load, such as 75. The particular unit load shown has already had one layer of its articles 77 removed, and two of the articles at the next lowest layer removed. Hence, the next article to be removed in accordance with the predetermined picking sequence is that indicated as 77–3. The searching means includes a transducer means for determining the orientation of the articles within unit load 75, with such transducer means being shown as a coordinated array of individual depending limit switch members 235. The number and array of such unit switch naturally depends upon the article sizes to be encountered. As shown in FIG. 4A, thirty such individual limit switches 235 are shown. However, in FIG. 3 and the circuit diagram of FIG. 7, only nine such switches are shown, principally for purposes of simplification. It should be recognized, however, that the number of switches may be added or decreased, and their matrix switching arrangements appropriately modified without departing from the spirit and scope of the instant invention.

After searching mechanism 200 is positioned at the uppermost portion of the stall from which an individual article is to be removed, it begins to move downward until the actuation of one or more of the limit switches. This indicates that the highest layer within the unit load containing articles has been reached. This condition is shown in FIG. 5 wherein the limit switch transducer members located wherein an article 77 still remains will be actuated, and those transducer members at the upper left front portion of the array, corresponding to a void in the uppermost layer of the unit load from which an article is to be removed, will not be actuated. The actuation of the individual transducer is matrix coordinated to determine the orientation of individual articles 77 still remaining within unit load 75. This, in turn, establishes the position of the next article 77–3 to be removed from the unit load and accordingly permits the direction of the picker 250 to that location as shown in FIG. 6. When the picker head 252 is thus in engagement with article 77–3, the article engaging vacuum pad 252 is actuated. The picker arm is then telescoped rearwardly to remove the article 77–3 from unit load 75. When the picker arm is sufficiently telescoped rearward, such that the article being removed extends outward of its storage stall location and over the spring loaded pan, the article engaging vacuum pad 252 is deactuated, such that the article will drop downward to resiliently mounted spring loaded pan 300. Pan 300 is tilted in the direction of the conveyor 35, such that the article will be transferred to that conveyor and ultimately to the load accumulation area.

The removal of article 77–3 may be accompanied with an upward movement of the picker arm 250 after the actuation of the vacuum so as to lift the carton or elevate the front end of carton 77–3 and thereby facilitate its removal from unit load 75. Also, the searching means 200 may be slightly elevated after it has performed its function of determining the orientation of articles remaining within the unit load, so as not to interfere with the subsequent removal of such article. Alternatively, the individual transducer member 235 may be resiliently mounted so as to prevent such interference.

FIGURE 9 is a cross-sectional view of a modified form of the instant invention wherein the article searching and article picking means may be incorporated within support member 220. Specifically, each of the individual transducer members, such as 235–1, is associated with an individual suction pad such as 252–1. Thus when the orientation of articles remaining within the unit load is determined by the searching means matrix 235, this signal is then used to actuate the selected article engaging suction pad 252–1 through 252–9 positioned at the article to be removed. This serves to advantageously speed up the operation of the automatic order selection while avoiding the need for a separate order picking arm and the associated mechanism and circuitry for positioning such arm at the location of the next article to be removed from the unit load.

In another modified form of the system, the data processing master control unit 15 may also include data handling capacity to store the pallet patterns of the unit loads contained at each of the various storage slot locations, as well as the number of individual articles previously selected from the unit loads. Its computer capacity may be programmed to first automatically direct order selection means 100 to the slot location containing the desired commodity to be picked, and then position the individual article picking means 250 such that picker head 252 will engage the next article to be removed, thereby dispensing with the need for the searching means 200 at the order selection means 100. The computer may also generate appropriate signals when a particular unit load or slot location has been depleted, to forwardly index the next unit load, or direct the order selection means to the next slot location containing the desired commodity. In the latter case, the empty slot location will be stored in the computer memory as a slot location available for loading by subsequently received merchandise.

*System operation*

Reference is now made to FIGURES 7 and 8. FIGURE 7 shows a typical electrical schematic of the control circuit for the article handling system of the principal embodiment of the present invention, and FIGURE 8 is a timing diagram indicating the sequential operation thereof.

Time $T_1$ corresponds to the instant when the order selection system 200, 250 has been directed to the appropriate slot location from which an article is to be picked. At such time, the various switches will be in the conditions illustrated by the solid lines of FIGURE 7, and an appropriate voltage will have been received from the master control unit 15 along the line A sufficient to energize the IN coil of selector motor 202. This causes telescoping inward of search means 200 such that the transducer support member 220 moves into the slot location. Such inward movement progresses until the IN limit switch $S_1$ is contacted at time $T_2$. Contact arm S–1a is then moved to the dotted position. This opens the ground return of the IN coil of motor 202 so as to stop the inward motion of transducer support member 220. At the same time, contact arm S–1b moves to its dotted position. This removes the power from the reset slot signal along B which will instruct the logic in the slot selector master control unit 15 to get set for the next slot location and to automatically remove the signal at line A.

The movement of switch arm S–1b to its dotted position also serves to apply power to the selector matrix 235 via the normally closed contact arm S–9a of the vacuum sensing switch S–9. As discussed above, the selector matrix consists of a suitable number of individual transducer members depending upon the particular requirements of the system, such as limit switches 235–1, 235–2 . . . 235–9. Power is applied through the series connection of the normally closed series connected contacts of transducer members 235–1 through 235–9 to energize the DOWN coil of vertical motor 140. This causes the selector matrix support 220 to commence moving down. The downward movement releases top limit switch S–2 causing its contact arm to move to the dotted position shown, thereby grounding one side of the UP coil of vertical motor 140.

Should the particular stall be empty, the transducer support member 220 will continue traveling downward until the bottom limit switch S–3 is actuated. This will remove power from the DOWN coil of vertical motor 140, serving to stop the downward motion of support member 220 and apply voltage to an empty slot signal line at line C. This signal may then be processed within the slot selector master control unit 15 to direct the order selection assembly 100 to the next slot having the desired particular commodity. In an alternative embodiment wherein the unit loads do not automatically feed forward upon a depletion of the forwardmost unit load, the establishment of the empty slot signal C may be used to actuate a reciprocating arm (not shown) of the order selection assembly 100 which engages a cooperating indexing member of a conveyor type support within the storage stall location for moving the next unit load forward after the outward movement of the search means from within the storage slot location.

Should the stall not be empty, the transducer matrix support member 220 will continue moving down until one or more of its transducer members 235–1, . . . 235–9, contacts one or more cartons. This corresponds to time $T_3$, and causes the contact arms of such transducer members to move upward. This will interrupt the series connection to the DOWN coil of vertical motor 140 stopping the downward movement of the transducer matrix support member 220.

Switches 235–1 through 235–9 are connected in the same sequence that it is desired to select cartons at any level. Thus if the level is full, all the switches 235–1 through 235–9 will operate. However, power will only be available at the normally open contact of switch 235–1. If the carton at switch 235–1 had previously been removed, switches 235–2 through 235–9 only will operate, but power will be available only at the normally open contacts of switch 235–2; and so forth for switches 235–3 to 235–9 in sequence. Thus power appears only at one of the three lines W–1, W–2, W–3 corresponding to a line in which the carton it is desired to pick is located. The picking sequence determined by the wiring sequence shown, is, as discussed above, to pick an article closest to the aisle working from left to right in any row and from front to back in the selected row.

The normally open contacts of switches 235–1 through 235–9 are connected in lines running in the front to back directions and a single wire W–1, W–2, W–3 is brought out for each line. The first switch in a sequence that is actuated, say switch 235–5, energizes the wire connected to that switch, i.e., W–2. Wires W–1 through W–3 go each to a switch S–A, S–B, S–C mounted in alignment with the corresponding lines. The normally closed contacts of S–A, S–B and S–C are all connected to the RIGHT coil of line positioning motor 260, and will be energized at time $T_3$ corresponding to at least one of the transducers 235 being actuated. This causes the picker arm support 253 to move towards the right. Switches S-A, S-B and S-C depend downwardly for sequential operation as the picker arm support 253 moves towards the right. If W-2 is energized, actuation of S-B deenergizes motor 260, at time $T_4$, causing the picker arm support 253 to stop its lateral movement.

Operation of S-B to the dotted position also connects power to the IN coil of picker motor 272 causing the whole picker assembly 250 to commence inward movement. Drop switch S-4 operates at this time, energizing relay K-1. Relay K-1 includes a contact arm K-1a which is of the make-before-break variety and serves to latch relay K-1 in its engaged condition.

When the carton switch S-5 contacts the article to be removed, at time $T_5$, it energizes vacuum solenoid valve K-2 which opens the vacuum line to the article engaging means 252, serving to grip the carton by suction. This causes vacuum sensing switch S-9 to energize, moving contact arm thereof S-9A to the dotted position and disconnecting power from the transducer matrix 235. The movement of vacuum switch arm S-9B disconnects power from the IN coil of picker motor 272 and applies power to the OUT coil of that motor. The picker arm 253 and the article to be selected which is engaged thereby, now travels backward until drop switch S-4 is contacted, at time $T_6$. This disconnects power from the OUT coil of 272 stopping the outward motion of the picker arm and deenergizing vacuum solenoid valve K-2. The latter switches the article engaging means 252 at the end of the picker arm 253 from the vacuum line to the atmosphere, causing the selected article to drop off the picker arm to spring supported pan 300.

The movement of drop switch S-4 back to its condition indicated by the solid line also applies power to the LEFT coil of line positioning motor 260, to the UP coil of vertical motor 140 and to the OUT coil of the selector motor 202, via contact arm K-1b of relay K-1. The picker arm then moves to the left until left limit switch $S_6$ is contacted at time $T_7$; the transducer matrix support member 220 moves up until the top limit switch S-2 is contacted at time $T_8$; and that support member also moves out until the OUT limit switch S-7 is contacted at point T-9. The operation of OUT limit switch S-7 removes power from relay K-1 and provides a signal indication at line D which is transmitted back to the slot selector control unit to indicate that the sequence of operation has been completed and it is now time to direct the order selection system 100 to the next storage slot location. It is to be naturally understood that such subsequent command signal may be to select one or more additional articles at the same slot location.

It should naturally be understood that numerous other modifications and variations may be made from the embodiment of the invention disclosed herein without departing from the spirit and scope of the invention. Accordingly, it is to be understood that the invention is not limited by such specific embodiment, but is defined in the appended claims.

The embodiments of the invention in which an exclusive privilege or property is claimed are defined as follows:

1. In an automatic article handling system for selectively removing individual articles from a location adapted to receive a grouped plurality of such articles, with said grouped plurality defining a unit load, the combination of searching means positionable at the location of said unit load, said searching means including means for determining the orientation of the articles actually present within said unit load, and establishing a unit load condition signal operatively related to the position within said unit load of the next article to be removed therefrom, said unit load condition signal generated in accordance with a predetermined sequence of removing individual articles from said unit load, picker means, means for presenting said unit load condition signal to said picker means such that said picker means is positionable at said position of the next article to be removed from the unit load, said picker means including article engaging means adapted to engage an individual article for removal from said position, while the other articles of said unit load immediately adjacent said individual article remain substantially intact.

2. In an automatic article handling system for selectively removing individual articles from a location adapted to receive a grouped plurality of such articles, with said grouped plurality defining a unit load, the combination of searching means positionable at the location of said unit load, said searching means including transducer means for determining the presence of articles actually present at predetermined positions within said unit load, and transducer condition operating means for receiving the outputs of said transducer means and establishing a unit load condition signal operatively related to the position, within said unit load, of the next individual article to be removed; said unit load condition signal generated in accordance with a predetermined sequence of removing individual articles from said unit load, picker means, means for presenting said unit load condition signal to said picker means such that said picker means is positionable at said position of the next article to be removed from the unit load, said picker means including article engaging means adapted to engage an individual article for removal from said position, while the other articles of said unit load immediately adjacent said individual article remain substantially intact.

3. In an automatic article handling system for selectively removing individual articles from a location adapted to receive a grouped plurality of such articles, with said grouped plurality defining a unit load, the combination of searching means positionable at the location of said unit load, said searching means comprising transducer means including a coordinated array of individual transducer members, each positionable to determine the presence of an article at a predetermined position within said unit load, said transducer members having a first signal condition corresponding to the presence of an article at its respective predetermined unit load position, and a second signal condition corresponding to the absence of an article at its respective predetermined unit load condition, transducer condition operating means for receiving said transducer condition signals and establishing a unit load condition signal operatively related to the position within said unit load of the next individual articles to be removed, picker means, means for presenting said unit load condition signal to said picker means such that said picker means is positionable at said position of the next article to be removed from the unit load, said picker means including article engaging means adapted to engage an individual article for removal from said position, while the other articles of said unit load remain substantially intact.

4. In an automatic article handling system for selectively removing individual articles from a location adapted to receive a grouped plurality of such articles, with said grouped plurality defining a unit load, the combination of searching means positionable at the location of said unit load, said searching means including means for determining the orientation of the articles actually present within said unit load, and establishing a unit load condition signal operatively related to the position within said unit load of the next article to be removed therefrom, said unit load condition signal generated in accordance with a predetermined sequence of removing individual articles from said unit load, picker means, means for presenting said unit load condition signal to said picker means, said picker means having an article engaging means adapted to engage an individual article for removal from said unit load while the other articles of said unit load immediately adjacent said individual article remain substantially intact, said picker means further including picker drive means responsive to said unit load condition signal for positioning said picker means at said position of the next article to be removed, and means for actuating said article engaging means to remove said individual article from said unit load.

5. In an automatic article handing system for selectively removing individual articles from a location adapted to receive a grouped plurality of such articles, with said grouped plurality defining a unit load, the combination of searching means positionable at the location of said unit load, said searching means comprising transducer means including a coordinated array of individual transducer members, each positionable to determine the presence of an article at a predetermined position within said unit load, said transducer members having a first signal condition corresponding to the presence of an article at is respective predetermined unit load position, and a second signal condition corresponding to the absence of an article at its respective predetermined unit load condition, transducer condition operating means for receiving said transducer condition signals and establishing a unit load condition signal operatively related to the position within said unit load of the next individual article to be removed, a picker means having an article engaging means adapted to engage an individual article for removal from said unit load while the other articles of said unit load remain substantially intact, picker drive means responsive to said unit load condition signal for positioning said picker means at said position of the next article to be removed, and means for actuating said article engaging means to remove said individual article from said unit load.

6. In an automatic article handling system for selectively removing individual articles from a location adapted to receive a grouped plurality of such articles, with said grouped plurality defining a unit load, the combination of searching means including a support member positionable at the upper extent of said unit load location, a coordinated array of individual transducer members, mounted to said support member and adapted to individually determine the presence of an article at a predetermined position within said unit load, said transducer members collectively determining the orientation of articles within the boundaries defined by said unit load location, said transducer members having a first signal condition corresponding to the presence of an article at its respective predetermined unit load position, and a second signal condition corresponding to the absence of an article at its respective predetermined unit load condition, transducer condition operating means for receiving said transducer condition signals and establishing a unit load condition signal operatively related to the position within said unit load of the next individual article to be removed, a picker means having an article engaging means adapted to engage an individual article for removal from said unit load while the other articles of said unit load remain substantially intact, picker drive means responsive to said unit load condition signal for position said picker means at said position of the next article to be removed, and means for actuating said article engaging means to remove said individual article from said unit load.

7. In an automatic article handling system as set forth in claim 6, wherein said unit load location is adapted to receive a stacked plurality of article containing layers, each of said layers adapted to contain a plurality of individual articles, said searching means including means for lowering said support member and stopping said support member adjacent the uppermost layer having an article to be removed, such that said transducer members determine the position within said uppermost layer of the next individual article to be removed.

8. In an automatic article handling system as set forth in claim 7, wherein said transducer members comprise limit switches, positioned about the surface of said support member, and depending therefrom for selective engagement with the remaining articles of the unit load as said support member is lowered.

9. In an automatic article handling system as set forth in claim 4, wherein said picker means including a reciprocating arm with said article engaging means located at the terminus thereof, said picking drive means including means for moving said arm in said reciprocating direction, and means for moving said arm in a direction transverse to said reciprocating direction, said reciprocating movement being first towards said unit load to engage the article to be removed, and then away from said unit load to withdraw the article therefrom.

10. In an automatic article handling system as set forth in claim 7, wherein said picker means including a reciprocating arm with said article engaging means located at the terminus thereof, said picking drive means including means for moving said arm in said reciprocating direction, and means for moving said arm in a direction transverse to said reciprocating direction, said reciprocating movement being first towards said unit load to engage the article to be removed, and then away from said unit load to withdraw the article therefrom.

11. In an automatic article handling system as set forth in claim 7, wherein said picker means including individual article engaging means about the surface of said support plate, said actuating means including means for actuating the individual article engaging means located at the position corresponding to the next article to be removed.

12. In an automatic article handling system as set forth in claim 11, wherein said article engaging means are vacuum actuated suction members depending from said support plate.

13. In an automatic article handling system as set forth in claim 9, said article engaging means being a vacuum actuation suction means at said arm terminus for reciprocating engagement with the article to be removed.

14. An automatic warehousing system, comprising in combination a storage volume including a plurality of individual storage slots, adjacently arranged along at least one article selection aisle, said storage slots adapted to receive unit loads containing a plurality of individual articles, the individual articles in each unit load being substantially similar, with the individual articles in certain of said unit loads differing with the individual articles in others of said unit loads, such that said storage slot locations individually contain substantially similar articles, and collectively contain a diverse assortment of articles, an order selection means movable along said article selection aisle and sequentially positionable at predetermined selectable ones of said storage slots containing articles to be selected, said order selection means comprising searching means positionable at the slot location of a selectable unit load, said searching means, including means for determining the orientation of the articles actually present within said unit load, and establishing a unit load condition signal operatively related to the position within said unit load of the next article to be removed therefrom, said unit load condition signal generated in accordance with a predetermined sequence of removing individual articles from said unit load, picker means, means for presenting said unit load condition signal to said picker means such that said picker means is positionable at said position of the next article to be removed from the unit load, said picker means including article engaging means adapted to engage an individual article for removal from said position, while the other articles of said unit load immediately adjacent said individual article remain substantially intact.

15. An automatic warehousing system, comprising in combination a storage volume including a plurality of individual storage slots, adjacently arrayed along at least one article selection aisle, said storage slots adapted to receive unit loads containing a plurality of individual articles, the individual articles in each unit load being substantially similar, with the individual articles in certain of said unit loads differing with the individual articles in others of said unit loads, such that said storage slot locations individually contain substantially similar articles, and collectively contain a diverse assortment of articles, an order selection means movable along said article selection aisle and sequentially positionable at predetermined selectable ones of said storage slots containing articles to be selected, said order selection means comprising searching means positionable at the slot location of a selectable unit load, said searching means comprising transducer means including a coordinated array of individual transducer members, each positionable to determine the presence of an article at a predetermined position within said unit load, said transducer members having a first signal condition corresponding to the presence of an article at its respective predetermined unit load position and a second signal condition corresponding to the absence of an article at its respective predetermined unit load condition, transducer condition operating means for receiving said transducer condition signals and establishing a unit load condition signal operatively related to the position within said unit load of the next individual article to be removed, a picker means having an article engaging means adapted to engage an individual article for removal from said unit load while the other articles of said unit load remain substantially intact, picker drive means responsive to said unit load condition signal for positioning said picker means at said position of the next article to be removed, and means for actuating said article engaging means to remove said individual article from said unit load.

16. An automatic warehousing system, comprising in combination a storage volume including a plurality of individual storage slots, adjacently arrayed along at least one article selection aisle, said storage slots adapted to receive unit loads containing a plurality of individual articles, the individual articles in each unit load being substantially similar, with the individual articles in certain of said unit loads differing with the individual articles in others of said unit loads, such that said storage slot locations individually contain substantially similar articles, and collectively contain a diverse assortment of articles, an order selection means movable along said article selection aisle and sequentially positionable at predetermined selectable ones of said storage slots containing articles to be selected, said order selection means comprising searching means positionable at the slot location of a selectable unit load, means for moving said searching means from said order selection aisle into said selectable slot location, said searching means including a support member positionable at the upper extent of said unit load location, a coordinated array of individual transducer members mounted to said support member and adapted to individually determine the presence of an article at a predetermined position within said unit load, said transducer members collectively determining the orientation of articles within the boundaries defined by said unit load location within said selectable slot, said transducer members having a first signal condition corresponding to the presence of an article at its respective predetermined unit load position, and a second signal condition corresponding to the absence of an article at its respective predetermined unit load condition, transducer condition operating means for receiving said transducer condition signals and establishing a unit load condition signal operatively related to the portion within said unit load of the next individual article to be removed, a picker means having an article engaging means adapted to engage an individual article for removal from said unit load while the other articles of said unit load remain substantially intact, picker drive means responsive to said unit load condition signal for positioning said picker means at said position of the next article to be removed, and means for actuating said article engaging means to remove said individual article from said unit load.

17. In an automatic warehousing system as set forth in claim 16, said slots adapted to receive a unit load containing a stacked plurality of article containing layers, each of said layers adapted to contain a plurality of individual articles, said searching means including means for lowering said support member and stopping said support member adjacent the uppermost layer having an article to be removed, such that said transducer members determine the position within said uppermost layer of the next individual article to be removed.

18. In an automatic warehousing system as set forth in claim 17, said transducer members comprising limit switches, positioned about the surface of said support member, and depending therefrom for selective engagement with the remaining articles of the unit load as said support member is lowered.

19. In an automatic warehousing system as set forth in claim 15, said picker means including a reciprocating arm with said article engaging means located at the terminus thereof, said picking drive means including means for moving said arm in said reciprocating direction, and means for moving said arm direction transverse to said reciprocating direction, said reciprocating movement being first towards said unit load to engage the article to be removed, and then away from said unit load to withdraw the article therefrom, out of said slot location and into said article selection aisle.

20. In an automatic warehousing system as set forth in claim 17, said picker means including individual article engaging means about the surface of said support plate, said actuating means including means for actuating the individual article engaging means located at the position corresponding to the next article to be removed.

21. An automatic warehousing system, comprising in combination, a storage volume comprising a plurality of individual storage slots adjacent arranged in horizontal and vertical rows, with first ends thereof terminating at an order selection aisle to form a first racking area, a loading area at the other end of said slots, said storage slots adapted to receive unit loads containing a plurality of individual articles, the individual articles in each unit load being substantially similar, with the individual articles in certain of said unit loads differing with the individual articles in others of said unit loads, such that said storage slot locations individually contain substantially similar articles, and collectively contain a diverse assortment of articles, said unit loads entering their respective slots at their load end, and positionable to said order selection end, an order selection means movable along said article selection aisle and sequentially positionable at predetermined selectable ones of said storage slots containing articles to be selected, said order selection means comprising searching means positionable at the slot location of a selectable unit load, said searching means including means for determining the orientation of the articles actually present within said unit load, and establishing a unit load condition signal operatively related to the position within said unit load of the next article to be removed therefrom, said unit load condition signal generated in accordance with a predetermined sequence of removing individual articles from said unit load, picker means, means for presenting said unit load condition signal to said picker means such that said picker means is positionable at said position of the next article to be removed from the unit load, said picker means including article engaging means adapted to engage an individual article for removal from said position, while the other articles of said unit load immediately adjacent said individual article remain substantially intact.

22. An automatic warehousing system, comprising in combination, a storage volume comprising a plurality of individual storage slots adjacently arranged in horizontal and vertical rows, with first ends thereof terminating at an order selection aisle to form a first racking area, a second racking area comprising a similar plurality of individual storage slots, with first ends thereof terminating at said order selection aisle, such that said first racking area is located along one side of said order selection aisle and said second racking area is located along the other side of said order selection aisle, loading areas at the other ends of said slots, said storage slots adapted to receive unit loads containing a plurality of individual articles, the individual articles in each unit load being substantially similar, with the individual articles in certain of said unit loads differing with the individual articles in others of said unit loads, such that said storage slot locations individually contain substantially similar articles, and collectively contain a diverse assortment of articles, said unit loads entering their respective slots at their load end, and positionable to said order selection end, an order selection means movable along said article selection aisle and sequentially positionable at predetermined selectable ones of said storage slots containing articles to be selected, said order selection means comprising rack selecting means for transferring its operation between said first and second racking areas, searching means positionable at the slot location of a selectable unit load, said searching means including means for determining the orientation of the articles actually present within said unit load, and establishing a unit load condition signal operatively related to the position within said unit load of the next article to be removed therefrom, said unit load condition signal generated in accordance with a predetermined sequence of removing individual articles from said unit load, picker means, means for presenting said unit load condition signal to said picker means such that said picker means is positioned at said position of the next article to be removed from the unit load, said picker means including article engaging means adapted to engage an individual article for removal from said position, while the other articles of said unit load immediately adjacent said individual article remain substantially intact.

23. In an automatic article selection system for selecting an individual one of a group of substantially similar articles, stacked together in a predetermined sequence to define a unit load, the subcombination comprising: searching means for determining the orientation of the individual articles remaining at the unit load, said searching means including a plurality of transducer means each positionable to determine the presence of an article at a predetermined region of the unit load and provide a responsive signal, and means for combining said responsive signals to establish a unit load condition signal operatively related to the position of the next article to be selected from the unit load in accordance with said predetermined stacking sequence, and picking means responsive to said unit load condition signal for engaging an individual article at said position, and removing said article, while the other articles of the unit load remain substantially intact.

24. An automatic warehousing system, comprising, in combination, a storage volume including a plurality of individual storage slots, adjacently arranged along at least one article selection aisle, said storage slots adapted to receive unit loads containing a plurality of individual articles, the individual articles in each unit load being substantially similar, with the individual articles in certain of said unit loads differing with the individual articles in others of said unit loads, such that said storage slot locations individually contain substantially similar articles, and collectively contain a diverse assortment of articles, an order selection means, said order selection means including article picking means having an article engaging means adapted to engage an individual article for removal from said unit load, while the other articles of said unit load remain substantially intact, means for positioning said order selection means at predetermined selectable ones of said storage slots containing articles to be selected, and means for determining the orientation of articles actually present within the selected unit load and positioning said article picking means at said determined position within the unit load of the next article to be removed therefrom in accordance with a predetermined picking sequence, such that said article engaging means removes said next individual article from said unit load.

References Cited

UNITED STATES PATENTS

| | | | |
|---|---|---|---|
| 2,988,237 | 6/1961 | Devol | 214—11 |
| 3,033,392 | 5/1962 | Baumann et al. | 214—16.4 |
| 3,206,041 | 9/1965 | McGrath | 214—8.5 |

GERALD M. FORLENZA, *Primary Examiner.*

F. E. WERNER, *Examiner.*